US 6,626,973 B2

(12) United States Patent
Park

(10) Patent No.: US 6,626,973 B2
(45) Date of Patent: Sep. 30, 2003

(54) FILTER MOUNTING DEVICE FOR VACUUM CLEANER

(75) Inventor: Sang-Jun Park, Changwon Kyeongnam (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 10/012,484

(22) Filed: Dec. 12, 2001

(65) Prior Publication Data

US 2002/0069627 A1 Jun. 13, 2002

(30) Foreign Application Priority Data

Dec. 13, 2000 (KR) .......................... 2000-76244

(51) Int. Cl.[7] .................. B01D 46/00; B01D 45/12
(52) U.S. Cl. .................. 55/480; 55/508; 55/DIG. 3; 96/423; 15/347
(58) Field of Search .................. 55/422, 480, 498, 55/DIG. 3, 508; 96/423; 210/91; 15/347, 352

(56) References Cited

U.S. PATENT DOCUMENTS

| 4,699,641 A | * | 10/1987 | Barnes, Jr. ................. 55/480 |
| 5,092,915 A | * | 3/1992 | Lackner ..................... 55/375 |
| 5,907,886 A | * | 6/1999 | Buscher ..................... 15/319 |
| 5,935,280 A | * | 8/1999 | Lee .......................... 55/378 |
| 6,299,661 B1 | * | 10/2001 | Bloomer .................... 55/385.3 |
| 6,406,505 B1 | * | 6/2002 | Oh et al. .................... 55/337 |
| 6,524,358 B2 | * | 2/2003 | Yang ......................... 55/337 |

* cited by examiner

Primary Examiner—Duane Smith
Assistant Examiner—Frank M. Lawrence
(74) Attorney, Agent, or Firm—Fleshner & Kim, LLP

(57) ABSTRACT

The present invention relates to a structure for confirming as to whether a filter is mounted into a vacuum cleaner. The structure for a vacuum cleaner according to the present invention comprises a cover including a discharging port for discharging air from which foreign materials are removed, a movable member of which positions are changed depending on coupling states thereof, and a support portion for moving the movable member; and a filter including a coupling means having a plurality of protrusions coupled to the support portion of the cover, a plurality of indented portions formed between the plurality of the protrusions, and an engagement piece formed to be spaced apart from the protrusions for changing the position of the movable member. The filter is detachably mounted to the support portion.

5 Claims, 4 Drawing Sheets

FILTER MOUNTING DEVICE FOR VACUUM CLEANER

BACKGROUND OF THE INVENTION

1. Field of the Invention

The present invention relates to a filter mounting device for a vacuum cleaner, and more particularly, to a filter mounting device constructed such that only after a filter for after first collecting foreign materials to be sucked in a cyclone mode and then collecting fine dusts has been mounted within a dust collecting casing, the dust collecting casing can be mounted within a main body of the vacuum cleaner.

2. Description of the Prior Art

FIG. 1 shows the constitution of a general vacuum cleaner. As shown in the figure, the vacuum cleaner comprises a main body 1 with a suction device for sucking indoor air installed therein and a suction portion 2 into which the air is introduced from a floor of a room by suction force generated from the main body.

The main body 1 includes a lower body 5 for installing the suction device therein, and an upper body 6 which is engaged with an upper portion of the lower body 5 and in which a control portion (not shown) for controlling the vacuum cleaner is mounted. A plurality of wheels 8 are installed at a lower side of the main body 1 for allowing the main body 1 to smoothly move on the floor. A discharging portion 8a is formed in each of the wheels 8 for discharging air, from which foreign materials are removed after the air has been introduced through the suction portion 2, from the main body 1.

Between the main body 1 and the suction portion 2, a suction hose 3b made of flexible material, an operation portion 4 connected to an end of the suction hose 3b for allowing a user to operate the cleaner, and an extension pipe 3a for interconnecting the operation portion 4 and the suction portion 2 are sequentially installed.

When electricity is applied to the vacuum cleaner via a wire 9 electrically connected to the suction device contained within the main body 1, the vacuum cleaner is in a standby state. At this time, when the user adjusts suction steps by using buttons on the operation portion 4, the suction device contained within the main body generates suction force corresponding to each suction step. The suction force generated from the suction device is exerted on the suction portion 2 via the suction hose 3b and the extension pipe 3a. By means of the suction force exerted on the suction portion 2, the air containing foreign materials such as dusts are introduced, and the foreign materials in the introduced air are filtered out by a dust collecting unit A. The air from which the foreign materials are filtered out is discharged to the outside of the main body 1 through the discharging portion 8a. Thus, cleaning is performed while going through the above processes.

As described above, the dust collecting unit A is a major component for filtering out the foreign materials contained within the air introduced through the suction portion 2. The dust collecting unit A is also mounted in a receiving space formed between the lower body 5 and the upper body 6.

FIG. 2 is an exploded perspective view of the dust collecting unit, illustrating in detail the dust collecting unit A which has been explained briefly with reference to FIG. 1. As shown in the figure, the dust collecting unit A includes a casing 7 with a top portion thereof opened, a cover 11 for opening and closing the top portion of the casing 7, and a filter 12 mounted below the cover 11.

The filter 12 is constructed such that a top surface 12a formed on the top of the filter can be fitted into or detached from a coupling portion 11a formed on a bottom surface of the cover 11. The cover 11 for mounting the filter 12 opens and closes the open top portion of the dust collecting casing 7.

A handle 7b is constructed to be formed on a rear surface of the casing 7 so that the user can grip the dust collecting casing 7. A frame portion 7f with an operation hole 7g included therein is formed above the handle 7b. An operation member 7i is installed in an inner space of the frame portion 7f, and an operation button 7a of the operation member 7i is installed to protrude through the operation hole 7g. An elastic body 7s is installed below the operation button 7a. Accordingly, the operation button 7a is always elastically supported within the frame portion 7f in an upward direction by the elastic body 7s. A catching protrusion 7c is formed on the operation member 7i and is elastically engaged with an inlet projection 6t of the main body 1 of the cleaner.

In order to prevent the operation member 7i from coming off from the interior of the frame portion 7f, a cover 7d is fixed to an upper portion of the frame portion 7f.

In order to mount the dust collecting unit A constructed as such into the main body 1 of the cleaner, the operation button 7a above the handle 7b formed at the rear surface of the casing 7 is pushed into the receiving space in a state where it is pressed down. Then, if the operation button 7a is set free, the catching protrusion 7c is caught into the inlet projection 6t of the upper body 6. Thus, the dust collecting unit A is kept to be coupled to the main body 1.

Here, it can be seen that the dust collecting unit A can be mounted to the main body 1 of the cleaner regardless of whether the filter 12 has been mounted to the cover 11. That is, according to a conventional filter mounting structure, the cover 11 can be mounted on the casing 7, even though the filter 12 has not been mounted to the cover 11. Thus, even though the filter 12 has not been mounted on the cover due to the user's error, the dust collecting unit A may be inadvertently engaged with the main body of the vacuum cleaner.

The dust collecting unit A performs a primary dust collecting function in a cyclone mode that large foreign materials drop down while air introduced through an inlet 11c is formed into a swirl flow within the casing 7, and a secondary dust collecting function that fine dusts are filtered out through the filter 12 after relatively large foreign materials have been filtered out.

As described above, if the filter 12 is not mounted to the cover, large dusts in the air introduced through the inlet 11c drop down by their own gravity from the swirl flow and are deposited onto a separation plate 7m. However, the fine dusts are introduced through an outlet 11b into the main body 1 without being filtered out. Accordingly, it may causes a problem related to cleaning efficiency in that the fine dusts and the like are substantially not filtered out. Further, inner parts may get out of order since the fine dusts flow into the main body of the cleaner.

Furthermore, according to the conventional structure of the vacuum cleaner, even though the vacuum cleaner is operated in a state where the filter 12 is not mounted to the cover as described above, there are no devices for informing the user of this state.

SUMMARY OF THE INVENTION

The present invention is contemplated to solve the above problems. An object of the present invention is to provide a filter mounting device for allowing a user to confirm as to whether a filter for filtering out fine dusts is mounted to a cover of a dust collecting unit.

According to an aspect of the present invention for achieving the above object, there is provided a filter mounting device for a vacuum cleaner including a casing having an open top portion and performing a primary dust collection in a cyclone mode, a cover for covering the open top portion of the casing, and a cylindrical filter engaged below the cover for performing a secondary dust collection by collecting fine dusts after the primary dust collection, comprising: a top surface of a filter which is detachably installed to a bottom surface of the cover, which is constructed to be rotatable by a predetermined angle in a mounted state, and which includes an engagement piece formed on one side of the periphery of the top surface such that a radial extension length thereof is gradually increased, and a coupling groove formed on the outside of the engagement piece; a support portion formed on the bottom surface of the cover for pivotably supporting the top surface of the filter mounted thereto by the predetermined angle; a movable member which is installed to be movable by a predetermined distance in a state where the movable member is in close contact with the bottom surface of the cover, and includes an engagement groove for closely receiving the engagement piece, a catching projection formed on one side of the engagement groove to be caught in the coupling groove and a confirmation piece formed to protrude beyond an opening formed in the rim portion of the cover at the opposite side of the engagement groove; and an elastic means for elastically supporting the movable member so that the confirmation piece can protrude through the opening, wherein when the top surface of the filter is rotated in a state where it is engaged to the support portion, the confirmation piece moves into the cover due to pushing of the engagement piece toward an inner surface of the movable member and the pushed state can be maintained by catch of the catching projection in the coupling groove.

DETAILED DESCRIPTION OF THE INVENTION

Hereinafter, preferred embodiments of the present invention will be explained in detail with reference to the accompanying drawings.

Figure 1:
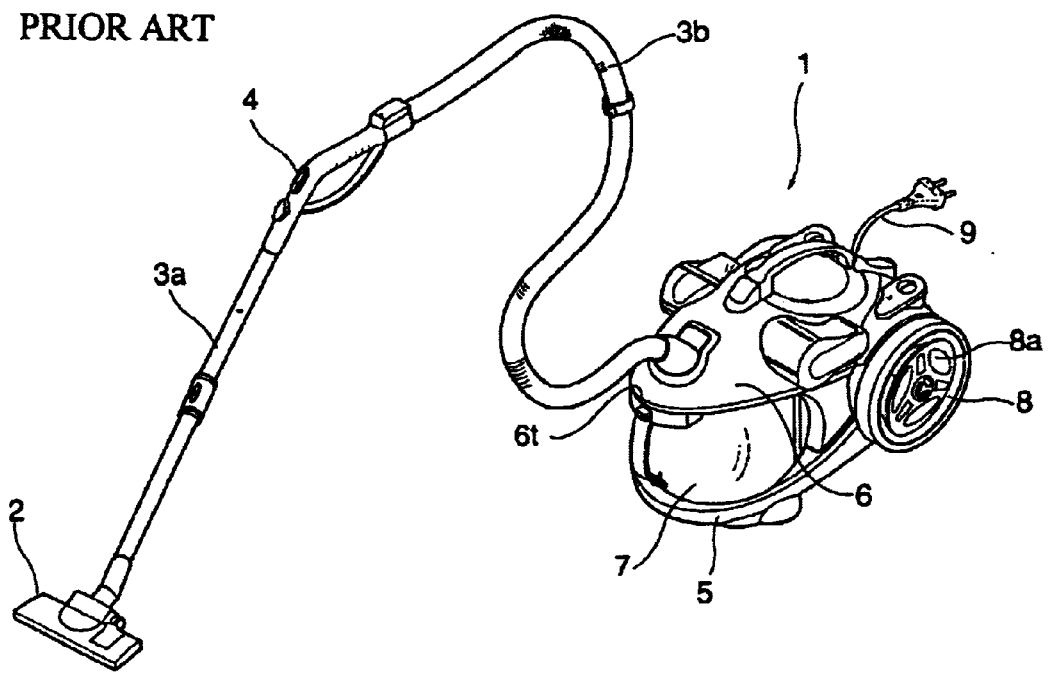
FIG. 1 is a perspective view of a general vacuum cleaner.
Figure 2:
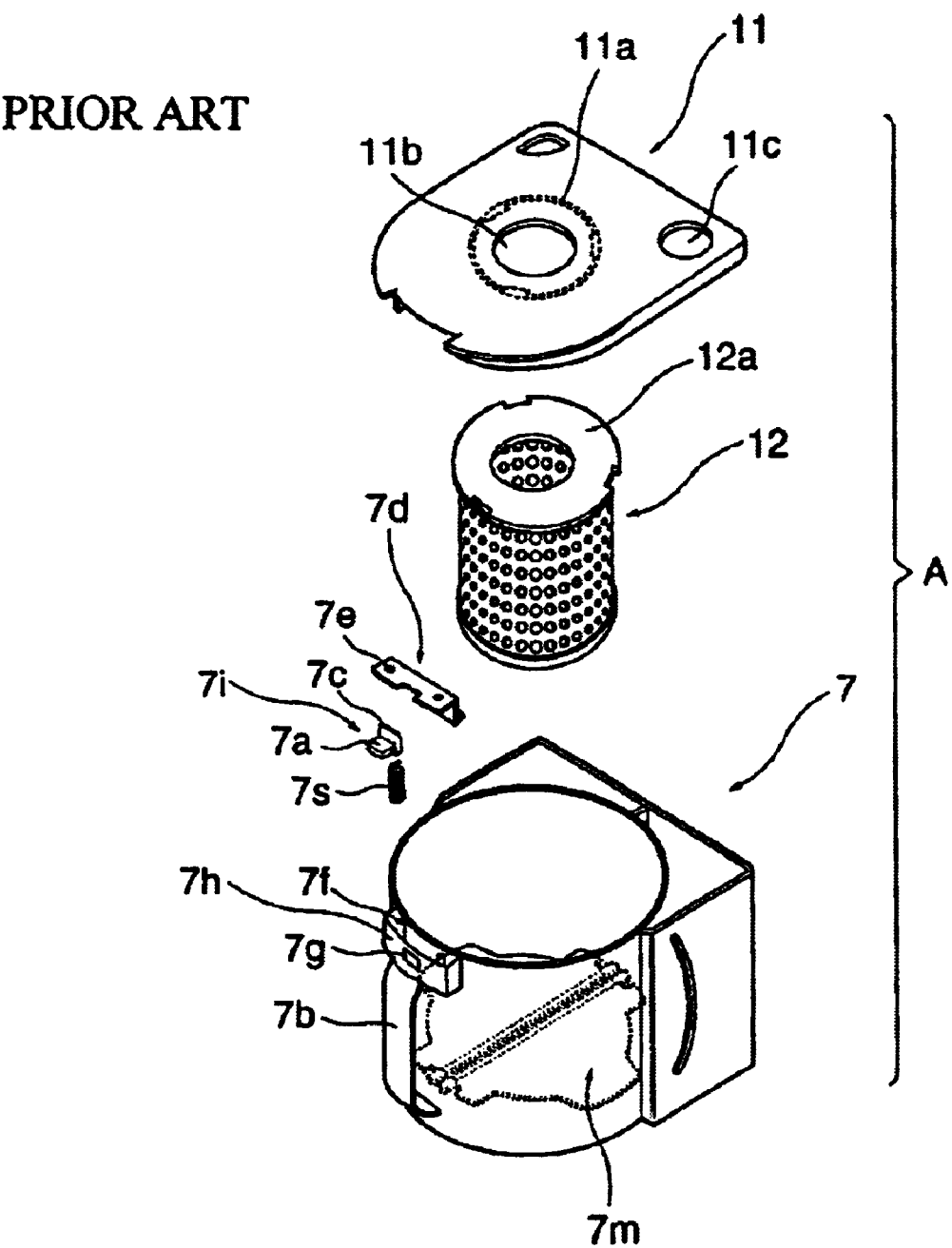
FIG. 2 is an exploded perspective view of a dust collecting casing, illustrating a state where a filter is mounted within a conventional vacuum cleaner.
Figure 3:
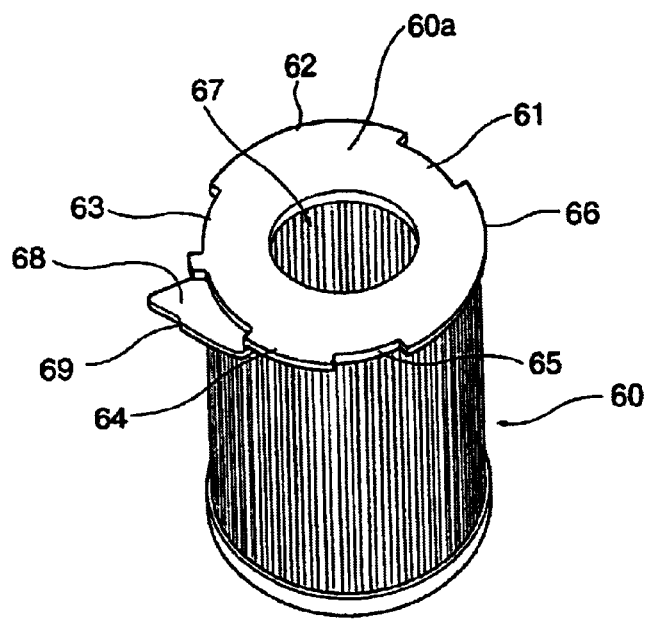
FIG. 3 is a perspective view of a filter coupling means according to the present invention.
Figure 4:
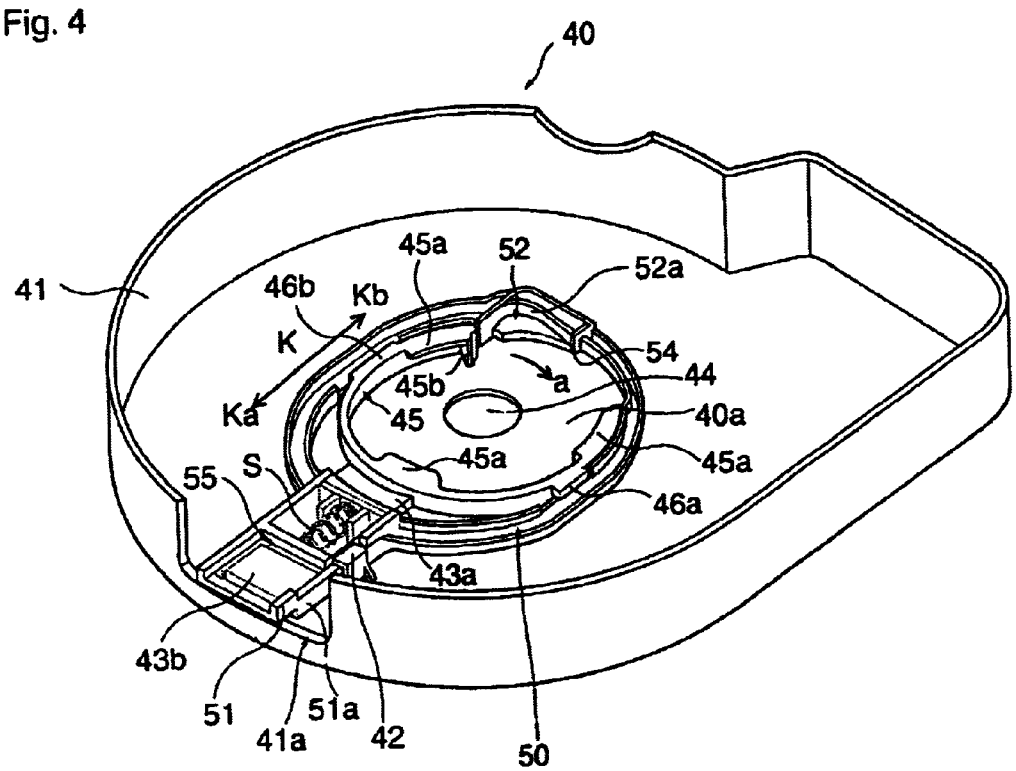
FIG. 4 is a perspective view of a filter mounting cover according to the present invention, as viewed from the bottom.

FIG. 3 is a perspective view of a filter 60 of the present invention, and FIG. 4 is a perspective view showing a bottom surface of a cover 40 to which the filter 60 is coupled. The filter 60 is constructed such that it can be detachably installed in a bottom surface 40a of the cover 40. Referring to FIG. 3 showing a state where the filter 60 has been mounted to the bottom surface 40a of the cover, an outer periphery of a top surface 60a of the filter 60 is provided with a plurality of radially extending protrusions 62, 64 and 66. Correspondingly, a plurality of indented portions 61, 63 and 65 are formed between the adjacent protrusions 62, 64 and 66, respectively. The top surface 60a is a plane, and thus, the protrusions 62, 64 and 66 are formed to extend radially outwardly from the plane.

An engagement piece 68 is formed at one side of the top surface 60a. The engagement piece 68 is formed to extend radially so that an extension distance from a central portion of the top surface 60a can be gradually increased. That is, the engagement piece 68 is constructed to extend more further outwardly from the outer periphery of the top surface 60a. An indented coupling groove 69 is formed at one side of an outer periphery of the engagement piece 68.

Meanwhile, the cover 40 to which the filter 60 is coupled is provided with a support portion 45 fixed to a bottom surface of the cover 40 for engaging with the top surface 60a of the filter 60, and a movable member 50 coupled around the support portion to be movable according to a mounting state of the filter 60. A discharging port 44 for discharging the filtered air is formed at the center of the cover 40, which coincides to a discharging port 67 of the filter 60.

The support portion 45 is a part to which the top surface 60a of the filter 60 is detachably installed. The support portion 45 is fixed to the bottom surface 40a of the cover 40 and is integrally formed with, for example, the cover 40. That is, the support portion 45 is constructed to protrude downward from the bottom surface 40a of the cover 40, or it is formed by fixing a separate ring-shaped member to the bottom surface 40a of the cover 40.

The support portion 45 takes the form of circle with a portion thereof disconnected. In an inner side of the support portion 45, a plurality of catching protrusions 45a corresponding to the protrusions 62, 64 and 66 of the filter are formed to be inwardly spaced apart from the bottom surface 40a of the cover by a predetermined gap. Thus, the protrusions 62, 64 and 66 of the top surface 60a of the filter 60 can be inserted into the cover through spaces between the catching protrusions 45. At this time, by slightly rotating the filter, the protrusions 62, 64 and 66 of the filter are fitted between the catching protrusions 45a and the bottom surface 40a of the cover so that the filter can be coupled to the cover.

A rotation prevention projection 45b, which comes in contact with the protrusions 62, 64 and 66 for preventing the filter 60 from being rotated more than a predetermined angle, is formed at one side of the support portion 45 with the catching protrusions 45a formed therein. The rotation prevention projection 45b may be formed to project downward from the bottom surface 40a of the cover, or inward from the side of the support portion 45.

In addition, outward protruding ribs 46a, 46b are formed at opposite portions of the support portion 45 to guide the movable member 50. A support piece 43a is formed at a predetermined portion of the support portion 45 for supporting an end of an elastic body S.

The movable member 50 is installed to surround the outside of the support portion 45, and be movable in a direction of an arrow K by a predetermined distance while being in close contact with and supported by the bottom surface 40a of the cover.

The movable member 50 is constructed to be generally circular. Further, the movable member can be kept to be in close with the bottom surface 40a of the cover by the ribs 46a, 46b of the aforementioned support portion 45.

The movable member 50 includes an engagement groove 52 which has a concave shape corresponding to that of the engagement piece 68 of the top surface 60a of the filter so that the engagement piece 68 can be received therein, and an inward protruding catching projection 54 which is formed on one end of the engagement groove 52 to be engaged with the coupling groove 69.

An outward projecting confirmation piece 51 is formed at a portion of the movable member 50 opposite to the engagement groove 52. The confirmation piece 51 extends to protrude outward beyond a rim portion 41 formed downward from the cover 40. A catching portion 55 is formed at the inside of the confirmation portion 51, and the elastic body S is interposed between the catching portion 55 and the support piece 43a of the support portion 45. The support piece 43a is substantially inserted between both sides 51a of the confirmation piece 51 below the confirmation piece 51. Thus, the support piece 43a performs a function of guiding the confirmation piece 51 along the direction of the arrow K.

The support piece 43a may be integrally formed with the support portion 45, and thus, is fixed to the fixed support portion 45. Therefore, the elastic body S substantially elastically urges the movable member 50 to a direction of an arrow Ka. Accordingly, the confirmation piece 51 is kept to protrude from the rim portion 41 by elastic force of the elastic body S.

The confirmation piece 51 takes the form of a straight line having a predetermined width, and its linear movement is guided by a guide 42 formed to protrude from the bottom surface 40a of the cover. The guide 42 is formed to be in close contact with lateral and bottom surfaces of the confirmation piece 51, and thus, the confirmation piece 51 is supported by the guide 42 so that its linear reciprocating motion in the direction of the arrow K is smoothly performed.

A guide piece 43b is installed on the bottom surface of the confirmation piece 51 to be in contact with inside portions of the sides 51a of the confirmation piece 51, and is integrally formed with the bottom surface 40a of the cover. Since both sides of the guide piece 43b come in contact with the inside portions of the sides 51a of the confirmation piece 51, the confirmation piece 51 can be supported by the guide piece 43b when it linearly reciprocates along the direction of the arrow K as described below.

Next, the whole operation of the filter mounting device according to the present invention will be specifically explained. First, the top surface 60a of the filter 60 is engaged to the inside of the support portion 45. At this time, the protrusions 62, 64 and 66 of the top surface 60a are received through the spaces defined between the catching protrusions 45a of the support portion 45. The engagement piece 68 of the top surface 60a of the filter is received into the engagement groove 52 of the movable member 50.

Since the movable member 50 is elastically urged to the direction of the arrow Ka by the elastic body S before the filter 60 is engaged into the support portion, the confirmation piece 68 is kept to protrude beyond the rim portion 41 of the cover 40.

In a state where the top surface 60a of the filter 60 is engaged to the support portion 45, the filter 60 is then rotated in a direction of an arrow a. As the filter 60 is rotated, the engagement piece 68 moves along an outside surface 52a of the engagement groove 52. Thus, the movable portion 50 moves in the direction of the arrow Kb. This movement of the movable member 50 is substantially due to the shape of the engagement piece 68, and particularly, it results from the operation that the outer periphery of the engagement piece 68 pushes the outside surface 52a of the engagement groove 52 in the direction of the arrow Kb.

When the movable member 50 moves in the direction of the arrow Kb, the linear motion of the confirmation piece 51 is guided by the guide piece 43b and the support piece 43a, and will be simultaneously guided by the ribs 46a, 46b of the support portion 45 in a state where it is in close contact with the bottom surface 40a of the cover.

In the course of this process, if the coupling groove 69 formed in the engagement piece 68 of the top surface 60a of the filter is caught into the catching projection 54 of the movable member 50, the movable member 50 comes to a stop at a position where it has been completely moved in the direction of the arrow Kb. In such a state, the state of the movable member 50 where the coupling groove 69 has been caught into the catching projection 54 can be maintained by the elastic force of the elastic body S. In addition, in such a state, the filter 60 cannot be further rotated since any one of the protrusions 62, 64 and 66 of the filter 60 is caught into the rotation prevention projection.

Figure 5:
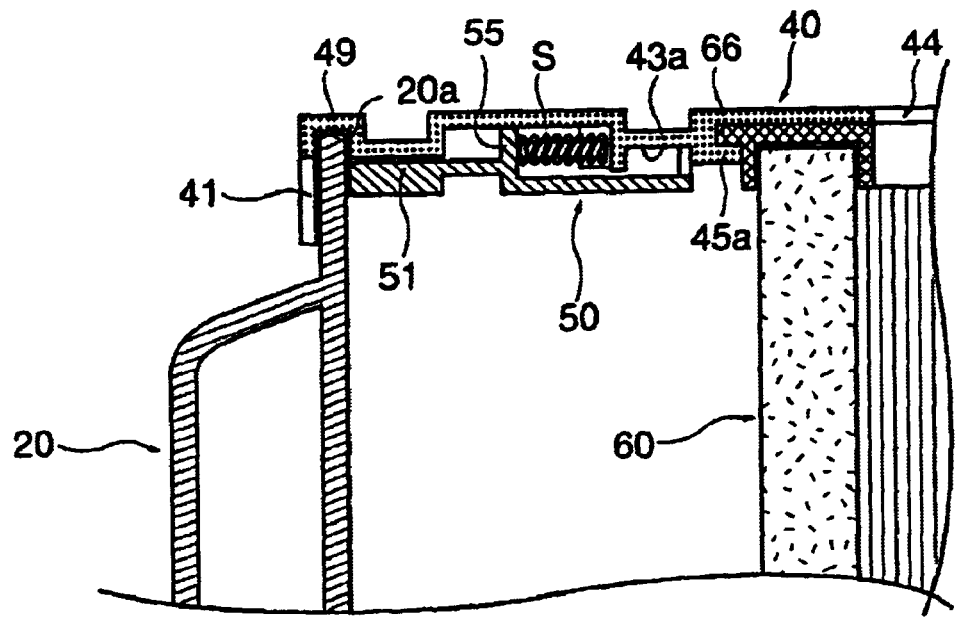
FIG. 5 is a partial sectional view showing a state where the cover to which a filter of a vacuum cleaner of the present invention is mounted is coupled to a dust collecting casing.

As shown in FIG. 5 illustrating this state, since the confirmation piece 51 has been completely moved in the direction of the arrow Kb, it is kept to be retracted into the rim portion 41 of the cover 40. That is, the confirmation piece 51 of the cover 50 formed on the bottom surface of the cover remains protruding beyond an opening 41a formed by cutting out a portion of the rim portion 41 of the cover. Then, the confirmation piece 51 moves inward with respect to the rim portion 41 as the filter 60 is rotated.

Further, as shown in FIG. 5, when the movable member 50 has been completely moved inwardly, the confirmation piece 51 of the movable member 50 causes the bottom of a seating groove 49, formed on the bottom surface 40a of the cover 40, to be opened. Thus, when a top portion 20a of the dust collecting casing 20 is inserted into the opened seating groove 49, the dust collecting casing 20 is perfectly covered with the cover 40. Finally, the dust collecting unit A having an appropriate height capable of being coupled within a receiving space formed within the main body of the cleaner can be completely assembled.

As the movable member 50 moves in the direction of the arrow Kb, the elastic body S interposed between the support piece 43a and a separation wall 55 is compressed. When the filter 60 is dismounted from the cover 40, the movable member 50 is urged to the direction of the arrow Ka by the restoring force of the elastic body S so that the seating groove 49 is blocked off by the confirmation piece 51. It will be easily understood to a person having an ordinary knowledge in the art.

Figure 6:
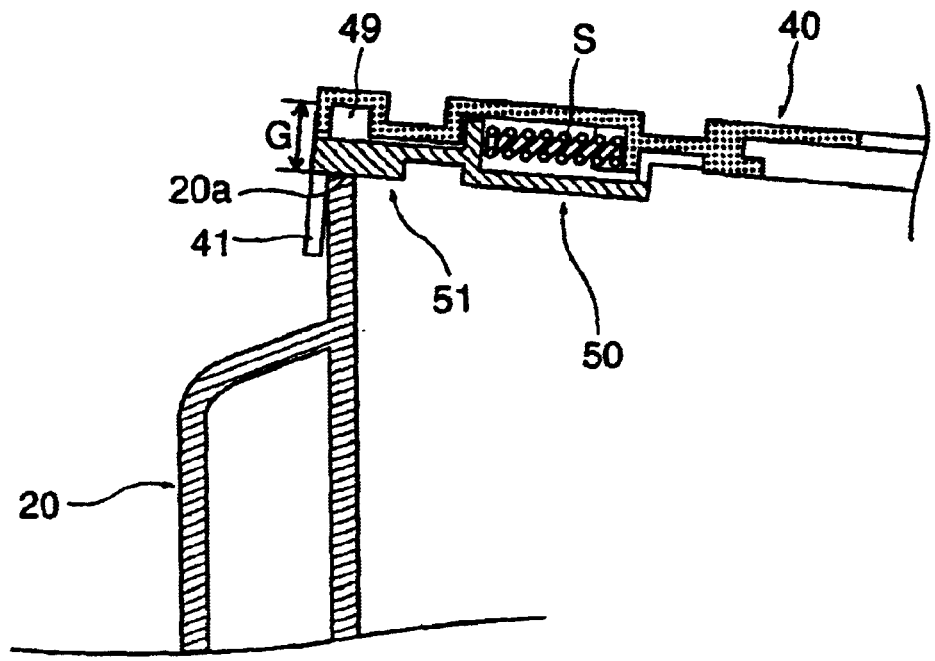
FIG. 6 is a partial sectional view showing a state where the cover to which the filter of the vacuum cleaner of the present invention is not mounted is coupled to the dust collecting casing.

FIG. 6. shows a case where the casing is covered with the cover 40 in a state where the filter 60 has not been mounted. That is, FIG. 6 is a sectional view illustrating that the dust collecting casing cannot be received within the main body of the cleaner if the filter 60 has not been mounted. In an initial state whether the movable member is urged to the direction of the arrow Ka by the elastic body S, the confirmation piece 51 thereof protrudes outwardly through the opening 41a formed on the rim portion 41 of the cover 40 as shown in the figure.

Since the seating groove 49 formed on the bottom surface of the cover 40 is blocked off by the confirmation piece 51 of the movable member 50, the top portion 20a of the dust collecting casing 20 cannot be inserted into the seating groove. Thus, the total height of the casing and the cover in a case where the cover 40 to which the filter 60 has not been mounted is engaged with the casing 20 is larger, by a height difference G, than that in a case of FIG. 5 where the dust collecting casing 20 is covered with the cover 40 to which the filter 60 has been mounted. Due to this height difference G, the dust collecting casing 20 cannot be mounted within the receiving space of the vacuum cleaner.

As described above, it is a basic technical feature or spirit of the present invention that the dust collecting casing cannot be coupled to the main body of the cleaner unless the filter for removing fine dusts from air has been correctly mounted to the cover.

According to the present invention constructed as such, the following effects can be expected.

Unless the filter has been mounted into the dust collecting unit for separating the foreign materials from the introduced air and collecting the foreign materials therein, the dust collecting unit cannot be engaged to the main body of the vacuum cleaner. Thus, it can be prevented beforehand to operate the vacuum cleaner in a state where the filter is not mounted into the dust collecting casing. Consequently, since all the problems occurring when the cleaner is used in a state where the filter is imperfectly or not mounted can be completely solved, there is an advantage in that reliability of the vacuum cleaner can be substantially further improved. Furthermore, there is additional convenience in that process of assembling the filter cannot be certainly omitted while fabricating the vacuum cleaner.

It will be understood to the skilled in the art that various changes and modifications may be made to the present invention without departing from the spirit and scope of the present invention. It is apparent that the scope of the present invention should be construed only by the appended claims.

What is claimed is:

1. A filter mounting device for a vacuum cleaner which includes a casing having an open top portion and performing a primary dust collection in a cyclone mode, a cover for covering the open top portion of the casing, and a cylindrical filter engaged below the cover for performing a secondary dust collection by collecting fine dusts after the primary dust collection, comprising:

a top surface of a filter which is detachably installed to a bottom surface of the cover, which is constructed to be rotatable by a predetermined angle in a mounted state, and which includes an engagement piece formed on one side of the periphery of the top surface such that a radial extension length thereof is gradually increased, and a coupling groove formed on the outside of the engagement piece;

a support portion formed on the bottom surface of the cover for pivotably supporting the top surface of the filter mounted thereto by the predetermined angle;

a movable member which is installed to be movable by a predetermined distance in a state where the movable member is in close contact with the bottom surface of the cover, and includes an engagement groove for closely receiving the engagement piece, a catching projection formed on one side of the engagement groove to be caught in the coupling groove and a confirmation piece formed to protrude beyond an opening formed in the rim portion of the cover at the opposite side of the engagement groove; and an elastic means for elastically supporting the movable member so that the confirmation piece can protrude through the opening, wherein when the top surface of the filter is rotated in a state where it is engaged to the support portion, the confirmation piece moves into the cover due to pushing of the engagement piece toward an inner surface of the movable member and the pushed state can be maintained by catch of the catching projection in the coupling groove.

2. The device as claimed in claim 1, wherein the top surface of the filter further includes a plurality of protrusions extending radially from a plane thereof, and the support portion includes radial spaces into which the protrusions of the top surface of the filter can be fitted and a plurality of catching protrusions which are spaced apart from the bottom surface of the cover by a predetermined gap to be rotatable by the predetermined angle in a state where the protrusions of the top surface of the filter are engaged to the support portion.

3. The device as claimed in claim 1, wherein the movable member is constructed in the form of a ring which surrounds the support portion.

4. The device as claimed in claim 1, wherein the movable member is supported to be in close contact with the bottom surface of the cover, by means of ribs which are formed to protrude outwardly from both sides of the support portion and spaced apart from the bottom surface of the cover by a predetermined gap.

5. The device as claimed in claim 1, wherein the confirmation piece is formed to take the rectilinear shape having a predetermined width, and movement of the confirmation piece is guided by a guide which protrudes downward from the bottom surface of the cover in a state where side and bottom surfaces thereof are supported to come into contact with the guide.

* * * * *